United States Patent Office 3,725,281

Patented Apr. 3, 1973

3,725,281

FERROMAGNETIC CHROMIUM DIOXIDE

Fritz Rodi, Kaldenhausen, and Franz Hund, Krefeld-Bockum, Germany, assignors to Farbenfabriken Bayer Aktiengesellschaft, Leverkusen, Germany No Drawing. Filed Dec. 28, 1970, Ser. No. 102,256
Claims priority, application Germany, Jan. 14, 1970, P 20 01 383.6
Int. Cl. C01g *37/02*
U.S. Cl. 252—62.51 7 Claims

ABSTRACT OF THE DISCLOSURE

In the production of ferromagnetic chromium dioxide wherein a chromium and oxygen containing compound is treated hydrothermally, there is used as the nucleating agent a compound of the formula $A_2TeO_6$ wherein A is one or more of chromium, iron, aluminum and gallium. The product is characterized by high coercivity in excess of 400 [Oe.] notwithstanding the use of relatively little tellurium.

This invention relates to a process for the production of high-grade ferromagnetic chromium dioxide for magnetogram supports.

Since the publication of an article by S. M. Ariya et al. (Zhur Obschei Khim 23, 1241 (1953)), it has been known that pure chromium dioxide can be obtained by decomposing chromic acid at an elevated temperature and pressure. The production of chromium dioxide under hydrothermal conditions is described in U.S. patent specification 2,956,955. Unfortunately, this process only gives coarse-grained products with a coercivity of less than 100 [Oe.]. Accordingly, the coercivity range of the products was unsuitable for the purposes of practical application.

The coercivity was too high for soft-magnetic materials and too low for hard-magnetic materials. Products of this kind were also unsuitable for magnetic recording techniques because coercivities in excess of 280 [Oe.] are required for this particular purpose, coercivities in excess of 400 [Oe.] being preferred.

There has been no shortage of attempts to produce chromium dioxide with improved magnetic properties. Since the magnetic properties are governed by the shape and size of the individual particles, the main problem in producing chromium dioxide is to vary the size and habit of the individual particles in a specific manner and to obtain as narrow a size distribution as possible. In addition, the individual particles should show little or no tendency towards aggregation into larger units which only complicates alignment in the magnetic field. In the size range suitable for recording magnetic impules, coercivity increases with decreasing particle size in the case of particles which are similar in shape so that a knowledge of the coercivity enables conclusions to be drawn as to particle size.

There are several techniques by which particle size and hence the other properties of hydrothermally produced chromium dioxide can be controlled. These processes can be divided into two groups.

According to United States patent specification 2,278,-263, finely divided chromium oxides are oxidized with chromium in the average oxidation state between 3 and 4 under hydrothermal conditions to form chromium dioxide. Chromic acid is preferably used as the oxidizing agent. Although it is possible by this process, in which compounds of chromium are the only starting materials, to obtain high-purity chromium dioxide with outstanding magnetic properties, other properties such as particle size and coercivities are not variable over a sufficiently wide range. The finely divided chromium oxide has to be used in a fairly large quantity, amounting to between 30 and 100%, based on the chromic acid used.

In a second group of processes, such properties as particle size, magnetic values and Curie temperature are varied by the addition of certain substances referred to in the following as modifiers. A number of possible modifiers is described in British patent specifications 859,937 and 1,006,610 and in United States patent specification 3,371,043. The elements and compounds of the elements Sb, Te, Ru and Sn are particularly suitable for varying particle size, whereas Fe and its compounds are particularly suitable for increasing the Curie temperature. Where modifiers controlling particle size are added, the particle size is reduced by an increase in the quantity of the modifier used, while coercivity is altered to higher values.

The effectiveness of the aforementioned modifiers is ultimately governed by the form in which and the conditions under which they are used. If it is desired to obtain products with outstanding properties, it is not sufficient to decompose chromic acid with the elements serving as modifiers or abitrary compounds of these elements under hydrothermal conditions.

Thus, it was proposed in United States patent specification 3,117,093 to subject chromium oxides rather than chromic acid to the pressure treatment with chromium in an average oxidation state between 4 and 6 in the absence or preferably in the presence of modifiers. The disadvantage of this process is that all the chromic acid used has initially to be converted into the aforementioned oxides with their relatively low oxidation state.

Another possibility of effectively introducing the modifying substances is described in United States patent specification 3,371,043. Ferromagnetic chromium dioxide containing a modifying agent in a relatively large quantity is prepared under hydrothermal conditions in a first stage and then reacted as a nucleus with more chromic acid in a second pressure stage. This process is relatively complicated because a high-pressure process is required for the first stage alone.

The modifier should be introduced in as active a form as possible to enable the necessary quantity of modifier to be minimized. Only in this way is it possible to avoid those disturbances which the modifier is capable of causing such as, for example, a reduction in the saturation magnetization.

Tellurium and its compounds such as tellurium dioxide and telluric acid for example represent particularly effective modifiers.

So far as the reaction of chromic acid with tellurium compounds at an eleveated pressure is concerned, the following mechanism is discussed by B. Kubota et al. in J. Amer. Ceram. Soc. 46, 550 (1963); compounds of tellurium together with chromic acid initially form the compound $Cr_2TeO_6$ which as nucleus influences the formation of chromium dioxide and controls particle size. Unfortunately, this spontaneous, inadequately controllable nucleus formation does not lead to products with the required properties. Thus, coercivities of at most 120 [Oe.] are quoted by Kubota in the aforementioned work. It is known from United States patent specification 3,371,-043 that it is not possible to obtain useful products in a single-stage hydrothermal process by reacting chromic acid with tellurium compounds. Although as indicated in United States patent specification 3,243,260 it is possible to obtain a coercivity of 390 [Oe.] by reacting chromic acid and telluric acid at an elevated pressure, the quantity of the tellurium required (6%, based on the chromic acid used) is extremely high.

It is accordingly an object of the invention to produce ferromagnetic chromium dioxide of high coercivity in simple fashion and without the need for excessve quantities of tellurium.

This and other objects and advantages are realized in accordance with the present invention which provides a process for the production of ferromagnetic chromium dioxide by hydrothermally treating a chromium-and-oxygen containing compound in the presence of a finely divided tellurium-containing nucleating agent crystallizing in the rutile or trirutile lattice and of the general type $A_2TeO_6$ wherein A is Cr, Fe, Al and/or Ga.

Surprisingly, it has been found that chromium dioxide with outstanding properties can be produced by separating formation of the $Cr_2TeO_6$ acting as nucleus from the hydrothermal reaction with chromic acid. It has also been found that not only $Cr_2TeO_6$ but generally compounds of the type $A_2TeO_6$ (A=Cr, Fe, Al and/or Ga) act as nuclei, for which purpose the aforementioned elements can be substituted for one another in whole or in part.

The process according to the invention for the production of chromium dioxide is extremely simple. The complicated pressure stage required for the nucleus formation described in United States patent specification 3,371,-043 is avoided and the modifier tellurium is introduced with a hitherto unknown level of activity. Since, furthermore, compounds of the type $A_2TeO_6$ have a high tellurium content they can be used in only small quantities, and the reaction mixture used for the hydrothermal pressure reaction can consist predominantly of chromic acid or other oxides of chromium.

A compound of the type $A_2TeO_6$ is initially prepared in finely divided form without using an elevated pressure, and then subjected in a second stage to the hydrothermal reaction wtih chromic acid or another suitable chromium compound which leads to the formation of chromium dioxide. The $A_2TeO_6$ compounds crystallizing in the trirutile lattice are known from the literature (G. Bayer, Ber. Dtsch. Keram. Ges. 39, 535 (1962)).

However, products obtained by the known process (by heating chromium (III) oxide with $TeO_2$ in an oxidizing atmosphere at 650 to 700° C.) are coarse-grained and are less well suited to or totally unsuitable for the application in question. Since the width of the individual needles in useful chromium dioxide preparations is in a range from 200 to 800 [A.], the preparations serving as nucleus of the type $A_2TeO_6$ must have particles smaller than the width of the chromium dioxide needles to be prepared.

Finely divided preparations of the general type $A_2TeO_6$ suitable for use as nuclei are advantageously prepared by reacting finely divided oxides or oxide hydrates or oxide aquates with suitable tellurium compounds at extremely low temperatures. To enable the reaction to take place at low temperatures, the reagents must be present in an active form. For example, chromium oxide hydrate green which consists of particularly small primary particles, can be coated with telluric acid and the resulting mixture converted into finely divided $Cr_2TeO_6$ at temperatures in the range from about 200 to 600° C., preferably from about 300 to 500° C.

However, the finely divided preparations of the $A_2TeO_6$ type are preferably obtained as follows:

A metal salt, preferably the nitrate, of the element A (A=Cr, Fe, Al and/or Ga) is added to an acid tellurium nitrate solution (obtained for example by dissolving metallic tellurium in $HNO_3$), and the resulting product neutralized with ammonia. The jelly-like precipitate is filtered off and is washed with only a little water, or none at all, so that the filter cake contains ammonium nitrate. The filter cake is dried and the ammonium nitrate decomposed. Temperatures of from 130 to 250° C. are sufficient for decomposition, depending upon the particular metal ion A used. The ammonium nitrate decomposes suddenly with a high exothermic reaction in which the tellurium used is oxidized into the hexavalent state. A loose powder which is very easy to divide up is left behind. An X-ray photograph shows only the very wide reflexes of a compound of the $A_2TeO_6$ type. The wide reflexes indicate that the crystallites are extremely small. The overstructure lines of the trirutile additional to the rutile phase are nowhere to be seen in an X-ray photograph of the extremely finely divided product which is particularly effective as nucleus. It is not certain whether orientation of the cations into the trirutile structure has not in fact taken place or whether it merely cannot be observed due to the poor development of the crystal lattice. For the purposes of the invention, therefore, the finely divided preparations of the general type $A_2TeO_6$ are referred to in the following as "rutile or trirutile structures."

The nucleus preparation accumulates in an extremely loose form through the decomposition of ammonium nitrate. Straightforward dry grinding, for example in a vibratory mill, is sufficient to render it usable for the further reaction.

In a preferred embodiment of the process, the finely divided thoroughly ground product of the general type $A_2TeO_6$ is mixed with chromic acid and water.

All or part of the chromic acid can be replaced by other chromium/oxygen compounds such as for example chromium oxides or chromium oxide hydrates of trivalent chromium or of chromium oxides with chromium in an average oxidation state between 3 and 6. Chromium oxides with chromium in the central oxidation stage between 4 and 6 can completely replace the chromic acid used. These products may be based on the crystalline phases $Cr_3O_8$ and/or $Cr_2O_5$ described by R. S. Schwatrz et al. in Am. Chem. Soc. 74, 167 (1952), or on X-ray amorphous products of the kind which can be obtained, for example, by thermally decomposing chromium nitrate or ammonium dichromate. Chromium oxides or chromium oxide hydrates with chromium in the oxidation state 3 or in the range from 3 to 4 can only be used in combination with chromic acid. Finely divided chromium oxides of the kind that can be obtained be dehydrating and tempering suitable chromium oxide hydrates, such as chromium oxide hydrate green or a product obtained by precipitation from chromium (III) salt solutions with alkalis, are particularly suitable. The particle size of the end product and hence also its coercivity can be controlled through the ratio of $A_2TeO_6$ to chromium/oxygen compound and optimally adapted to a certain field of application. The nucleus preparations of the $A_2TeO_6$ type are used in quantities of from about 0.1 to 5% by weight and preferably in quantities of from about 0.3 to 3% by weight, based on the chromium/oxygen compounds.

The quantity of water added to the reaction mixture is not critical, although it should be large enough to enable a free-flowing paste to be formed. Quantities of water of from about 5 to 20% by weight, based on the chromium/oxygen compound used, are favorable.

The mixture of the nucleus preparation and chromium/oxygen compound and water, accommodated in a suitable vessel, for example a refined steel beaker, is heated in an autoclave to temperatures of from about 200 to 500° C. and preferably from about 280 to 360° C. under pressures of from about 1 to 500 kg./cm.$^2$, preferably from about 150 to 350 kg./cm.$^2$. The reaction time is not critical and can amount to between about 1 and 8 hours and longer.

The product is washed free from chromate with water and dried in a drying cabinet at about 110 to 120° C.

The chromium dioxide preparations obtained as described in the foregoing show values for remanent magnetization in the range from about 400 to 550 [gauss, cm.$^3$ g.$^{-1}$] and coercivity in the range from about 200 to 600 [Oe.]. The preparations consist of needle-like particles of uniform shape and size with a size range of from about 0.1 to 2 microns needle length and about 0.01 to 0.1 micron needle length.

The outstanding magnetic properties and the favorable dimensions of the individual particles make the product obtained by the process described in the foregoing particularly suitable for magnetic impulse recording and reproduction.

The process according to the invention is illustrated by the following examples.

EXAMPLE 1

151 g. of telluric acid were dissolved in 400 ml. of distilled water. 120 g. of chromium oxide hydrate green (corresponding to 100 g. of $Cr_2O_3$) were introduced into the resulting solution with stirring. Water was evaporated while stirring until a viscous suspension had formed. The residual water was removed initially in a vacuum drying cabinet at 40° C. and then in air in a drying cabinet at 110° C. The preparation was tempered for 1 hour at 400° C. An X-ray photograph showed only the reflexes associated with the rutile and trirutile lattice, an indication that the compound $Cr_2TeO_6$ had been formed.

19.7 g. of this product were mixed with 930 g. of chromic acid and 120 ml. of $H_2O$ in a refined steel beaker, and the refined steel beaker placed in a 2-liter capacity autoclave lined with refined steel containing 600 ml. of water. The autoclave was heated over a period of 3 hours to 340° C., and this temperature was maintained for 8 hours. The pressure was adjusted to 300 kg./cm.$^2$. The reaction product was pulverized, washed free from chromate with distilled water and dried at 110° C. The following magnetic values were measured: Br/ρ(rho):470 [gauss, cm.$^3$ g.$^{-1}$]; $I_{Hc}$:401 [Oe.].

EXAMPLE 2

14.8 g. of the nucleus preparation described in Example 1 were mixed with 620 g. of chromic acid, 310 g. of an amorphous chromium oxide which had been obtained by carefully decomposing ammonium dichromate at a temperature in the range from 85–210° C., and 150 ml. of distilled water, and the resulting mixture was heated in an autoclave under the conditions specified in Example 1.

A product with the following magnetic data was obtained: Br/ρ:484 [gauss, cm.$^3$ g.$^{-1}$]; $I_{Hc}$:431 [Oe.].

EXAMPLE 3

150 g. of metallic tellurium were dissolved in a mixture of 1500 ml. of water and 840 ml. of concentrated nitric acid. The somewhat cloudy solution was filtered and cooled to room temperature. The tellurium nitrate solution thus obtained was combined with a solution of 940 g. of $Cr(NO_3)_3 \cdot 9\ H_2O$ in 1200 ml. of $H_2O$, followed by neutralization up to pH 6.5 with 2700 ml. of a semi-concentrated ammonia solution. Neutralization took 2 minutes and was accompanied by vigorous stirring. On completion of neutralization, the volume of the suspension was adjusted to 8 liters, followed by filtration under suction. The unwashed filter cake was air-dried at 150° C. under normal pressure in a drying cabinet. After 24 hours, a short-lived exothermic reaction occurred through the sudden onset of the decomposition of ammonium nitrate, which heated the product to between 300 and 400° C. After another 4 hours, a second less pronounced exothermic reaction was observed. Thereafter, the product was left in the drying cabinet for another 6 hours.

380 g. of a very soft brownish-black powder were obtained. Very wide reflexes were found in an X-ray photograph all of which were attributed to a compound of the rutile structure. The *d*-value for the (110) reflex was measured at 3.20 [A.] which was satisfactorily consistent with the value of 3.21 [A.] quoted by G. Bayer (Ber. Dtsch. Keram. Ges. 39, 535 (1962)) for $Cr_2TeO_6$. The average crystallite size determined by X-ray photography from the line widening on the reflex (110) amounted to 55 [A.], and the specific surface according to BET was measured at 24 [m.$^2$/g.]. The product was dry ground with steatite spheres in a vibratory mill.

19.7 g. of the $Cr_2TeO_6$ nucleus preparation were subjected to the pressure treatment described in Example 1 with 930 g. of chromic acid and 120 ml. of distilled water. The following magnetic value was determined on the chromium dioxide preparation:

Br/*p*:[gauss, cm.$^3$ g.$^{-1}$]; $I_{He}$:523 [Oe.]

EXAMPLE 4

9.85 of the $Cr_2TeO_6$ nucleus preparation of Example 3 were mixed with 930 g. of chromic acid and 120 ml. of distilled water and the mixture subjected to the pressure treatment described in Example 11. A chromium dioxide preparation with the following magnetic data was obtained:

Br/*p*:492 [gauss, cm.$^3$ g.$^{-}$]; $I_{He}$:474 [Oe.]

EXAMPLE 5

4.93 of the $Cr_2TeO_6$ nucleus preparation of Example 3 were mixed with 930 g. of chromic acid and 120 ml. of distilled water, and the resulting mixture subjected to the pressure treatment described in Example 1. A chromium dioxide preparation with the following magnetic data was obtained: Br/ρ:463 [gauss, cm.$^3$ g.$^{-1}$]; $I_{Hc}$:412 [Oe.].

Comparison of Examples 3, 4 and 5 shows that a coercivity can be varied in the range of importance to practical application by varying the quantity of the nucleus preparation $Cr_2TeO_6$.

Example 5 also shows that sufficiently fine-grained matrial with a coercivity in excess of 400 [Oe.] can be obtained with very small quantities of the nucleus preparation (0.53% of $Cr_2TeO_6$ corresponding to 0.21% of Te, based on the chromic acid used).

By way of comparison, it is pointed out that, according to United States patent specification 3,243,260 (Example 3) 6% of tellurium, based on the chromic acid used, are required to obtain a coercivity of 390 [Oe.]. According to United States patent specification 3,371,043 (Example 20) it is necessary to use 0.4% of Te (based on the chromic acid used during pigment formation) to obtain a coercivity of 393 [Oe.] in a much more complicated two stage pressure process.

EXAMPLE 6

150 g. of metallic tellurium were dissolved in a mixture of 1500 ml. of $H_2O$ and 840 ml. of concentrated nitric acid. The slightly cloudy solution was filtered and cooled to room temperature. The tellurium nitrate solution thus obtained was combined with a solution of 930 g. of $Fe(NO_3)_3 \cdot 9H_2O$ in 1200 ml. of $H_2O$, followed by neutralization up to pH 6.5 with 2460 ml. of a semi-concentrated ammonia solution. Neutralization was accompanied by vigorous stirring. On completion of neutralization, the volume of the suspension was adjusted to 8 liters, followed by filtration under suction. The unwashed filter cake was air dried for 42 hours at 150° C. under normal pressure in a drying cabinet. The drying temperature was then increased to 200° C. After 4.5 hours, a sudden exothermic reaction was observed, after which the product was left for another 40 hours in the drying cabinet kept at 200° C.

390 g. of a brown loose powder were obtained. Very wide reflexes were found in an X-ray photograph, all of which were attributed to a compound of the rutile structure. The d-value for the (110) reflex was measured at 3.26 [A.] which is in satisfactory consistency with the value of 3.25 [A.] quoted by G. Bayer (Ber. Dtsch. Keram. Ges. 39, 535 (1962)) for $Fe_2TeO_6$. The specific surface according to BET was measured at 125 [m.$^2$/g.].

9.85 of the $Fe_2TeO_6$ nucleus preparation were mixed with 930 g. of chromic acid and 120 ml. of distilled water, and the resulting mixture exposed to hydrothermal conditions for 8 hours in an autoclave at a temperature of 334° C. and under a pressure of 240 kg./cm.$^2$. The following magnetic values were measured on the chromium dioxide preparation obtained in this way:

Br./ρ:454 [gauss, cm.$^3$ g.$^{-1}$]; $I_{Hc}$:390 [Oe.]

The tellurium of the nucleating agent ends up in the product and the range of about 0.3 to 3% by weight of nucleating agent based on chromic acid corresponds to a tellurium content of about 0.14 to 1.5% in the chromium dioxide. Preferably the tellurium content is below about 1% and more preferably below about 0.5% and it is especially surprising that such low contents nonetheless give products of the indicated sizes, coercivities and remanent magnetization.

It will be appreciated that the instant application and examples are set forth by way of illustration and not limitation and that various modifications and changes may be made without departing from the spirit and scope of the present invention.

What is claimed is:

1. In the production of ferromagnetic chromium dioxide wherein a chromium oxide in which the chromium has a valence of at least 3 is treated hydrothermally at a temperature of about 200 to 500° C., at a pressure of about 1 to 500 kg./cm.$^2$, the improvement which comprises adding to the chromium oxide prior to said hydrothermal treatment a nucleating agent of the formula $A_2TeO_6$ wherein A is one or more of chromium, iron, aluminum and gallium, said nucleating agent being in the form of crystals having a rutile or trirutile lattice, in an amount sufficient to result in a chromium dioxide having a remanent magnetization in excess of about 400 gauss, cm.$^3$ g.$^{-1}$ and a coercivity in excess of about 200 Oe.

2. A process as claimed in claim 1, wherein the nucleating agent is in finely divided form and is used in about 0.3 to 3% by weight of the chromium oxide.

3. A process as claimed in claim 1, wherein the chromium oxide comprises chromic acid.

4. A process as claimed in claim 1, wherein the nucleating agent is prepared by coating a finely divided oxide or oxide hydrate of A with telluric acid, followed by tempering at about 200 to 600° C.

5. A process as claimed in claim 4, wherein chromium oxide hydrate green is used as the finely divided oxide-hydrate.

6. A process as claimed in claim 1, wherein the nucleating agent is prepared by adding ammonia to a solution mixture of tellurium nitrate and $A(NO_3)_3$ to form a precipitate containing the corresponding oxide hydrate and ammonium nitrate and drying said precipitate whereby the ammonium nitrate decomposes and the oxide hydrate is converted into finely divided $A_2TeO_6$.

7. A process as claimed in claim 6, wherein the nucleating agent is in finely divided form and is used in about 0.3 to 3% by weight of the chromium oxide which comprises chromic acid, the hydrothermal treatment being carried out at a temperature of from about 280 to 360° C. and a pressure of from about 150 to 350 kg./cm.$^2$.

References Cited

UNITED STATES PATENTS

| | | | |
|---|---|---|---|
| 3,371,043 | 2/1968 | Hund et al. | 252—62.51 |
| 3,575,689 | 4/1971 | Mihara et al. | 252—62.51 X |

OTHER REFERENCES

Kubota et al.: "J. of the American Ceramic Society," vol. 46, No. 4, November 1963, pp. 550–6.

J. COOPER, Primary Examiner

U.S. Cl. X.R.

423—607